US012681492B2

(12) United States Patent
Guo et al.

(10) Patent No.: US 12,681,492 B2
(45) Date of Patent: *Jul. 14, 2026

(54) FLIGHT CONTROL METHOD AND APPARATUS, AND CONTROL DEVICE

(71) Applicant: SZ DJI TECHNOLOGY CO., LTD., Shenzhen (CN)

(72) Inventors: Zhuo Guo, Shenzhen (CN); Zhuo Xie, Shenzhen (CN); Haoyu Li, Shenzhen (CN); Wenlin Li, Shenzhen (CN); Ding Wang, Shenzhen (CN); Zebo Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 161 days.

This patent is subject to a terminal disclaimer.

(21) Appl. No.: 18/543,984

(22) Filed: Dec. 18, 2023

(65) Prior Publication Data

US 2024/0160225 A1      May 16, 2024

Related U.S. Application Data

(63) Continuation of application No. 17/473,543, filed on Sep. 13, 2021, now Pat. No. 11,886,203, which is a
(Continued)

(51) Int. Cl.
*G05D 1/46* (2024.01)
*G01C 21/00* (2006.01)
(Continued)

(52) U.S. Cl.
CPC .............. *G05D 1/46* (2024.01); *G01C 21/38* (2020.08); *G05D 1/43* (2024.01); *G08G 5/22* (2025.01);
(Continued)

(58) Field of Classification Search
None
See application file for complete search history.

(56) References Cited

U.S. PATENT DOCUMENTS 9,162,753 B1    10/2015  Panto et al.
10,322,801 B1 *  6/2019  Yeturu ................... G06V 20/17
(Continued)

FOREIGN PATENT DOCUMENTS

CN          102854886 A     1/2013
CN          102955478 A     3/2013
(Continued)

OTHER PUBLICATIONS

World Intellectual Property Organization (WIPO) International Search Report PCT/CN2016/100236 Jul. 6, 2017 6 Pages.
(Continued)

*Primary Examiner* — Tamara L Weber
(74) *Attorney, Agent, or Firm* — ANOVA LAW GROUP, PLLC

(57) ABSTRACT

A control method includes generating, through a processor, route data of a route, instructing the movable object to execute the route data, detecting an execution status of the movable object, in response to detecting that the movable object is in a route recovery state, controlling the movable object in the route recovery state to resume the execution of the route according to a starting position. The starting position includes at least one of a waypoint of the plurality of waypoints before an interruption, a position determined according to a flight position recorded at a time of the interruption, or a user-designated waypoint.

20 Claims, 7 Drawing Sheets

Related U.S. Application Data continuation of application No. 16/364,625, filed on Mar. 26, 2019, now Pat. No. 11,119,506, which is a continuation of application No. PCT/CN2016/100236, filed on Sep. 27, 2016.

(51) Int. Cl.

| | |
|---|---|
| *G05D 1/43* | (2024.01) |
| *G08G 5/22* | (2025.01) |
| *G08G 5/26* | (2025.01) |
| *G08G 5/32* | (2025.01) |
| *G08G 5/55* | (2025.01) |
| *G08G 5/57* | (2025.01) |

(52) U.S. Cl.
CPC .................. *G08G 5/26* (2025.01); *G08G 5/32* (2025.01); *G08G 5/55* (2025.01); *G08G 5/57* (2025.01); *B64U 2201/20* (2023.01)

(56) References Cited

U.S. PATENT DOCUMENTS

| | | | |
|---|---|---|---|
| 2017/0129603 A1 | 5/2017 | Raptopoulos et al. | |
| 2017/0177925 A1* | 6/2017 | Volkart .................. | B64U 20/87 |
| 2017/0233071 A1* | 8/2017 | Pilskalns .................. | G08G 5/58 |
| | | | 701/2 |
| 2017/0259940 A1 | 9/2017 | Blomberg et al. | |
| 2017/0334559 A1 | 11/2017 | Bouffard et al. | |
| 2018/0188051 A1 | 7/2018 | Gaspard-Boulinc et al. | |

FOREIGN PATENT DOCUMENTS

| | | |
|---|---|---|
| CN | 104932526 A | 9/2015 |
| CN | 105259916 A | 1/2016 |
| CN | 105730694 A | 7/2016 |
| CN | 105790422 A | 7/2016 |
| CN | 205507548 U | 8/2016 |
| CN | 105955290 A | 9/2016 |
| CN | 105955294 A | 9/2016 |
| CN | 107636551 A | 1/2018 |
| EP | 2775367 A2 | 9/2014 |
| FR | 2826110 B1 | 1/2004 |
| JP | 2001209427 A | 8/2001 |

OTHER PUBLICATIONS

Hall, "On Board Flight Computers for Flight Testing Small Uninhabited Aerial Vehicles", Mechanical and Aerospace Engineering, North Carolina State University, Raleigh, NC, 2002, p. 11-139 to 11-143 (Year: 2002).

* cited by examiner

S201

Receiving route data

S202

Analyzing the received route data, according to a preset splitting condition

S203

Splitting the route represented by the route data into multiple sub-routes, if the route data meets the preset splitting condition

S204

Determining the to-be-executed sub-route from the multiple sub-routes and transmitting the sub-route to the aircraft

FLIGHT CONTROL METHOD AND APPARATUS, AND CONTROL DEVICE

CROSS-REFERENCE TO RELATED APPLICATIONS

This application is a continuation of application Ser. No. 17/473,543, filed on Sep. 13, 2021, which is a continuation of application Ser. No. 16/364,625, filed on Mar. 26, 2019, now U.S. Pat. No. 11,119,506, issued Sep. 14, 2021, which is a continuation of International Application No. PCT/CN2016/100236, filed on Sep. 27, 2016, the entire contents of both of which are hereby incorporated by reference.

TECHNICAL FIELD

The present disclosure generally relates to the field of flight control technology and, more particularly, to a flight control method, a flight control apparatus, and a control device.

BACKGROUND

An unmanned aerial vehicle (UAV) through communication with a remote controller at ground end can perform tasks for a user, such as photo and videography, geological monitoring, disaster monitoring. The ground end transmits a command-flow signal to fly the aircraft to a designated location in a certain area. Meanwhile, the UAV transmits the photographed image to the ground end in the form of a data-flow signal, and the ground end analyzes the data-flow signal to obtain the corresponding image. The existing technology requires the user to control the UAV in real time, thus automation and intelligence have not yet reached a high level.

BRIEF SUMMARY OF THE DISCLOSURE

One aspect of the present disclosure provides a control method. The control method comprises generating, through a processor, route data of a route, instructing the movable object to execute the route data, detecting an execution status of the movable object, and in response to detecting that the movable object is in a route recovery state, controlling the movable object in the route recovery state to resume the execution of the route according to a starting position. The execution status of the movable object includes at least one of an interrupted state, a normal state, or the route recovery state. The movable object in the interrupted state undergoes an interruption of the execution of the route. The starting position includes at least one of a waypoint of the plurality of waypoints before an interruption, a position determined according to a flight position recorded at a time of the interruption, or a user-designated waypoint.

Another aspect of the present disclosure provides a control device. The control device comprises, a memory storing a program code, and a processor configured to execute the program code to: generate route data of a route, instruct the movable object to execute the route data, detect an execution status of the movable object, and in response to detecting that the movable object is in a route recovery state, control the movable object in the route recovery state to resume the execution of the route according to a starting position. The execution status of the movable object includes at least one of an interrupted state, a normal state, or the route recovery state. The movable object in the interrupted state undergoes an interruption of the execution of the route. The starting position includes at least one of a waypoint of the plurality of waypoints before an interruption, a position determined according to a flight position recorded at a time of the interruption, or a user-designated waypoint.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined under conditions without conflicts.

Figure 1:
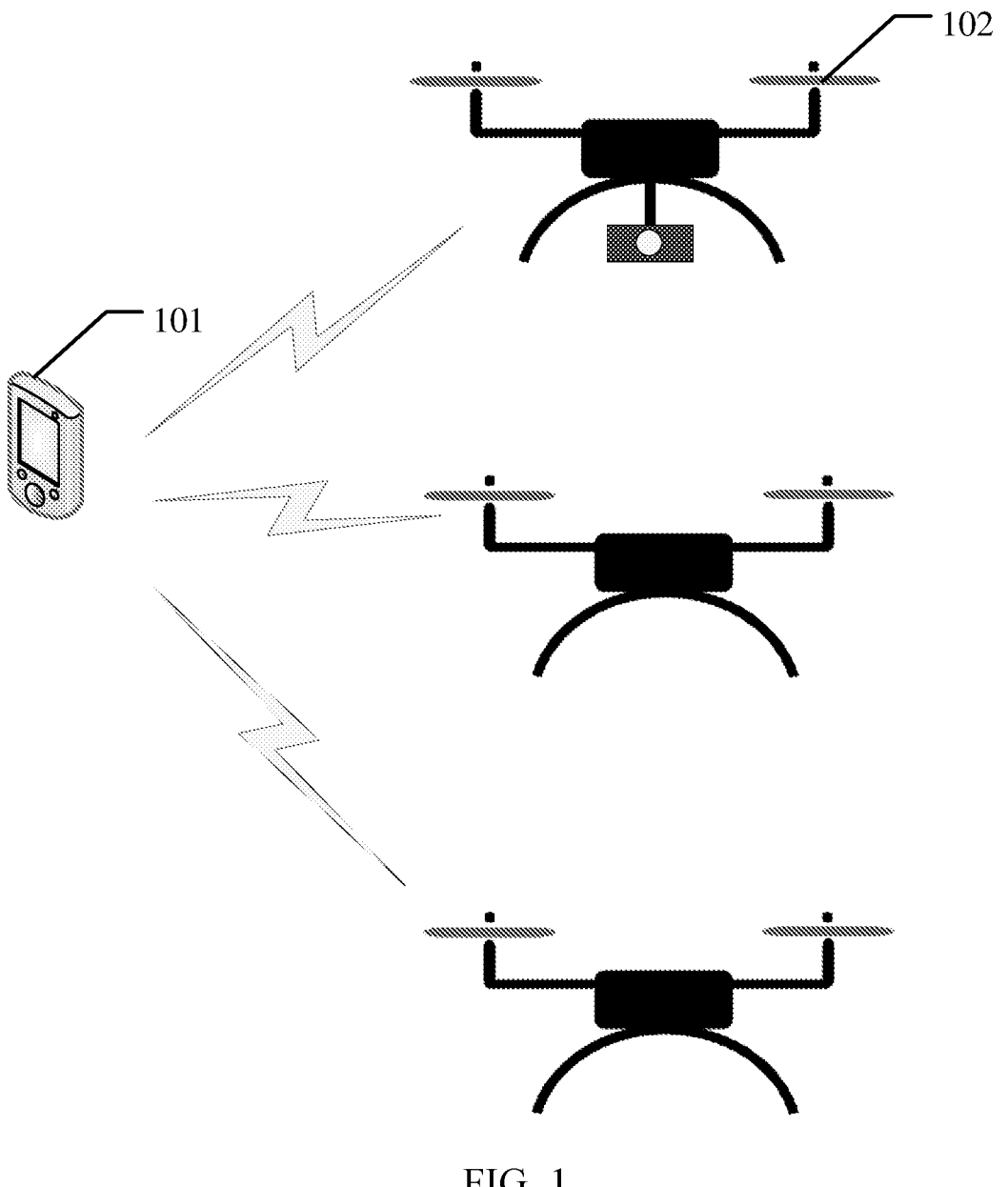
FIG. 1 illustrates a schematic structural diagram of an exemplary flight system consistent with disclosed embodiments.

A flight path of an aircraft is referred to as a route. In one embodiment, a user can edit the route for the aircraft on a remote-control device at ground end, such that the aircraft, such as an unmanned aerial vehicle, can autonomously fly on the route. FIG. 1 illustrates a schematic structural diagram of an exemplary flight system consistent with disclosed embodiments. As shown in FIG. 1, such flight system includes a control device 101 as a remote-control device at the ground end and one or more aircrafts 102. The control device 101 may be a smart mobile phone, a tablet computer, an aircraft ground control station, etc.

To edit the route, the control device 101 may present to the user an interactive interface including a map of a certain target area. The user can mark points on the map according to needs. These points may be afterwards used as flight waypoints of the aircraft. In route data, the waypoints may exist in the form of coordinates. In some embodiments, in addition to the coordinates, the waypoints may also include angle-control information of a pan-tilt member mounted on the aircraft and/or photographing-control information of a camera mounted on the aircraft.

The control device 101 may determine the positions of the points marked by the user on the map of the interactive interface as the waypoints. The coordinates of the waypoints may be GPS position coordinates of these points, and flight heights of the waypoints may be a default height value. According to the needs and the altitudes of the actual positions, the user can also dynamically configure the heights for one or more waypoints in the control device 101. The route may be configured in other manners. For example, the user may only input the coordinates of several positions in the control device 101 as the waypoints, and the control device 101 may generate a route according to the inputted coordinates.

The control device 101 may transmit the generated route data to the aircraft 102. The route data may include a plurality of waypoints. As above, each waypoint may be a GPS position coordinate. The heights of the waypoints may be the default flight height of the aircraft 102. In some embodiments, the waypoint may also include the GPS coordinate and the height value. After receiving the route data, the aircraft may execute the route data and fly on the route represented by the route data. In some embodiments, the controller in the aircraft 102 may operate the aircraft 102 to fly towards these waypoints in turn according to the various waypoints included in the route data, thus achieving the flight on the route represented by the route data to these waypoints in turn.

Since the aircraft 102 when flying needs to consider factors such as the weight, volume, battery capacity of the aircraft 102 and the memory capacity of the storage for storing the route data, there is a limit to the hardware structure of the aircraft 102. As for some route data, the aircraft 102 may not be able to execute these route data. In some embodiments, if the route data edited by the user, including a large number of waypoints, are too large to allow the memory configured in the aircraft 102 to completely store the received route data, the aircraft 102 may not be able to execute such route data. In some embodiments, if the route represented by the route data is too long and the battery capacity of the aircraft 102 is insufficient to complete the route data over the long route, the aircraft 102 may not be able to execute such route data.

To avoid the above-mentioned situation, the user may initially set up a route with less waypoints (or a shorter route) for ensuring that the aircraft 102 can complete the flight of the corresponding route. For example, route data including 100 waypoints can be set, which is the amount of data that the memory of the aircraft 102 can store. As another example, a route of 500 meters can be set according to the remaining battery capacity of the aircraft 102.

If the user edits a route on the control device 101 with the number of the waypoints greater than or equal to a preset threshold number, or if the user edits a route with the length greater than or equal to a preset threshold length, then according to the route data under such circumstance, the control device 101 can split the route corresponding to the route data to obtain multiple sub-routes of this route. The split of the route by the control device 101 may be based on a preset splitting strategy.

In one embodiment, an even assignment may be implemented by the splitting strategy according to the total number of the waypoints, such that the number of the waypoints included in each sub-route can be equal. In some embodiments, an even assignment may be implemented according to the total length of the route, such that the length of each sub-route can be equal. In another embodiment, the control device 101 may simultaneously transmit the route data of the sub-routes obtained by splitting to the plurality of aircrafts 102. In some embodiments, the splitting of the route represented by the route data according to the splitting strategy may include: splitting the route represented by the route data into multiple sub-routes according to the length of the route that can be executed by the remaining battery capacity of each aircraft 102.

After obtaining the multiple sub-routes, the control device 101 may display each sub-route on the interactive interface. The user may select any one or more of the sub-routes by clicking and may assign any one or more selected sub-routes to one or more aircrafts 102. After obtaining the multiple sub-routes, the control device 101 may also select one or more aircrafts as the target aircraft(s) to assign the sub-routes by means of random assignment. For example, the route has a total number of 300 waypoints and the sub-route that has the waypoints numbered between 101-200 may be uploaded to the target aircraft(s). In some embodiments, the sub-routes may be assigned to a plurality of aircrafts in a sequential order, according to the sequence assigned when the route is split into the sub-routes and according to the numbering of the plurality of aircrafts. For example, the route has a total number of 300 waypoints, and the sub-routes that have the waypoints numbered between 1-100, 101-200, and 201-300 may be uploaded to three different aircrafts A, B, and C, respectively. The control device 101 may select the three aircrafts to simultaneously start executing the planned routes in parallel, thus increasing task execution efficiency and not being limited by the hardware structure of the aircraft.

After executing the sub-routes, the aircraft 102 may hover at a certain position, transmit a flight request to the control device 101, and trigger the control device 101 to determine a to-be-executed sub-route that needs to be continuously executed from the multiple sub-routes.

The control device 101 may automatically prompt the user to manually select the next sub-route by a popped-up window, or may directly upload the next sub-route. In some embodiments, upon obtaining the multiple sub-routes, each sub-route can be sequentially marked. For example, each sub-route section may be marked in the form of the first section, the second section, . . . , the n-th section. After a certain sub-route is executed, the next sub-route may be determined according to the order represented by the sequence marks. For example, after the sub-route section (sequentially marked as the second section) that has waypoints numbered between 101-200 is executed and the flight request is transmitted, the sub-route section (sequentially marked as the third section) corresponding to the waypoints numbered between 201-300 may be automatically uploaded. As such, the user can plan the route on the interactive interface according to needs without limiting the number of the waypoints or the length of the route, and the route can be directly uploaded as separated sections during flight.

Moreover, after the aircraft 102 executes a certain sub-route, the position of this executed sub-route in the route represented by the route data may be acquired, and then the to-be-executed sub-route may be determined from the obtained multiple sub-routes according to the acquired positions. For example, other unexecuted sub-routes closest to the executed sub-route may be found.

In some other embodiments, while the aircraft 102 executes the preset route data to perform the corresponding flight mission, there may be other events such as landing, returning home, changing battery. In some embodiments, in the course of executing the flight mission, it may be required to manually operate the aircraft 102 to fly for a period of time and then return back to the route to continue performing the flight mission. For example, upon photographing at a certain waypoint on a planned route, it may be found that a place not far away from this waypoint also needs to be photographed. Accordingly, it may be required to temporarily fly the aircraft to the nearby place for photographing. During the flight on the route represented by the route data, once the above situations occur and result in an interruption of the flight mission, it may be required to resume the flight after the interrupt for ensuring that the flight mission can be completed on the route represented by the preset route data.

According to whether the aircraft 102 is flying on the route represented by the route data and the duration of the flight, and/or whether the aircraft 102 is manually controlled, the execution status of the aircraft 102 upon flying on the route represented by the preset route data may be determined. In some embodiments, the execution status may include three states: an interrupted state, a normal state, and a route recovery state. The interrupted state may indicate the route represented by the route data that is not currently executed by the aircraft 102. In some embodiments, for example, if it is determined that the aircraft 102 does not fly on the route represented by the route data within the preset duration threshold, the aircraft 102 may be regarded to be in the interrupted state. The normal state may refer to the state where the aircraft 102 is executing the route data. For example, within the preset duration threshold, the aircraft may be flying on the route represented by the route data. The route recovery state may indicate that the aircraft 102 has been switched from interrupting execution of the route data to resuming execution of the route data. For example, the aircraft 102 may be switched from manual control to automatic control based on the route data and may have not yet reached the route represented by the route data. For another example, the aircraft 102 may receive a control instruction transmitted by the user to re-execute the original route.

When the route recovery state is detected, according to a preset route-recovery strategy, starting position of the aircraft 102 may be determined. According to the starting position, the aircraft 102 may be operated to resume the flight on the route represented by the route data. That is, according to the starting position, the aircraft 102 may be operated to reach the route represented by the route data.

In some embodiments, according to the instruction of the route-recovery strategy, the starting position may be any waypoint on the route represented by the route data that was executed before the interruption. The starting position may also be determined according to the flight position recorded at the time of interruption. In some embodiments, the starting position may be the waypoint on the preset route which is the closest to the flight position (i.e., having the shortest distance to the flight position), or may be the last waypoint before the closest waypoint, or may be the next waypoint before the closest waypoint, or may be the next waypoint after the closest waypoint, or may be a waypoint selected from several waypoints within a preset distance range of the flight position.

Moreover, if the execution status of the plurality of aircrafts 102 is at the route recovery state, according to the preset route-recovery strategy, the starting position of each aircraft 102 may be determined. According to the respectively determined starting position of each aircraft 102, each aircraft 102 may be respectively operated to resume the flight on the route represented by the preset route data which was interrupted during execution. For each aircraft 102 whose execution status is at the route recovery state, the method of determining the starting position may be similar to the above-mentioned determination method. That is, any waypoint on the route represented by the preset route data, or the waypoint closest to the flight position where the route is interrupted, or the last waypoint before such closest waypoint, or the next waypoint after such closest waypoint, or a waypoint selected from several waypoints within the preset distance range of the flight position, may be determined as the starting position.

The preset route data may be received from a remote-control device at the ground end (e.g., the control device 101). The procedures of generating a route at the ground end and interacting with the aircraft 102 based on the data corresponding to such route may refer to the above description, which is not repeated herein.

Figure 2:
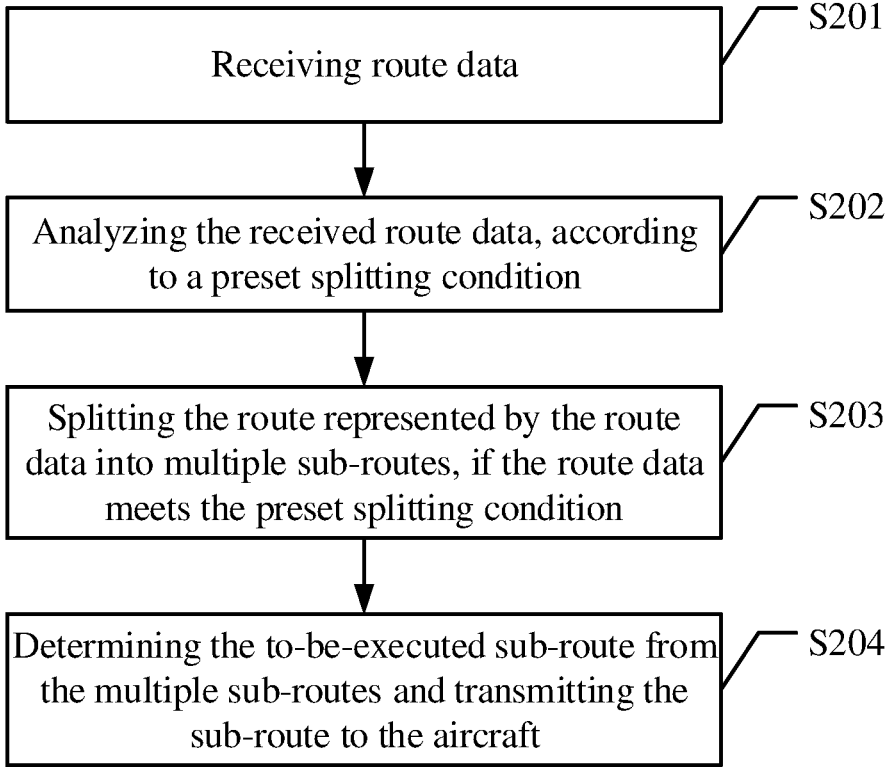
FIG. 2 illustrates a flowchart of an exemplary flight control method consistent with disclosed embodiments.

FIG. 2 illustrates a flowchart of an exemplary flight control method consistent with disclosed embodiments. The method consistent with the present disclosure may be executed by a control device consistent with the disclosure. The control device may be a smart mobile phone, a tablet computer, a dedicated smart remote-controller, etc. The control device may have a user interface, including but not limited to a touch-screen display and/or a keyboard. The user may perform human-machine interaction through the user interface to complete operations, such as route editing.

As shown in FIG. 2, at S201, route data is received. The route data may be obtained by editing and may be used to instruct the aircraft to fly on the route represented by the route data. An interactive interface may be displayed to the user on the control device. In the interactive interface, each waypoint configured by the user may be received. The route data may be automatically generated based on the configured waypoints. The generated route data may mainly include coordinates of the waypoints. Moreover, the user may also directly draw a line segment by touching the screen. The route data may be also generated based on the line segment. The route data may include waypoint coordinates corresponding to a large number of points on the line segment.

Figure 3:
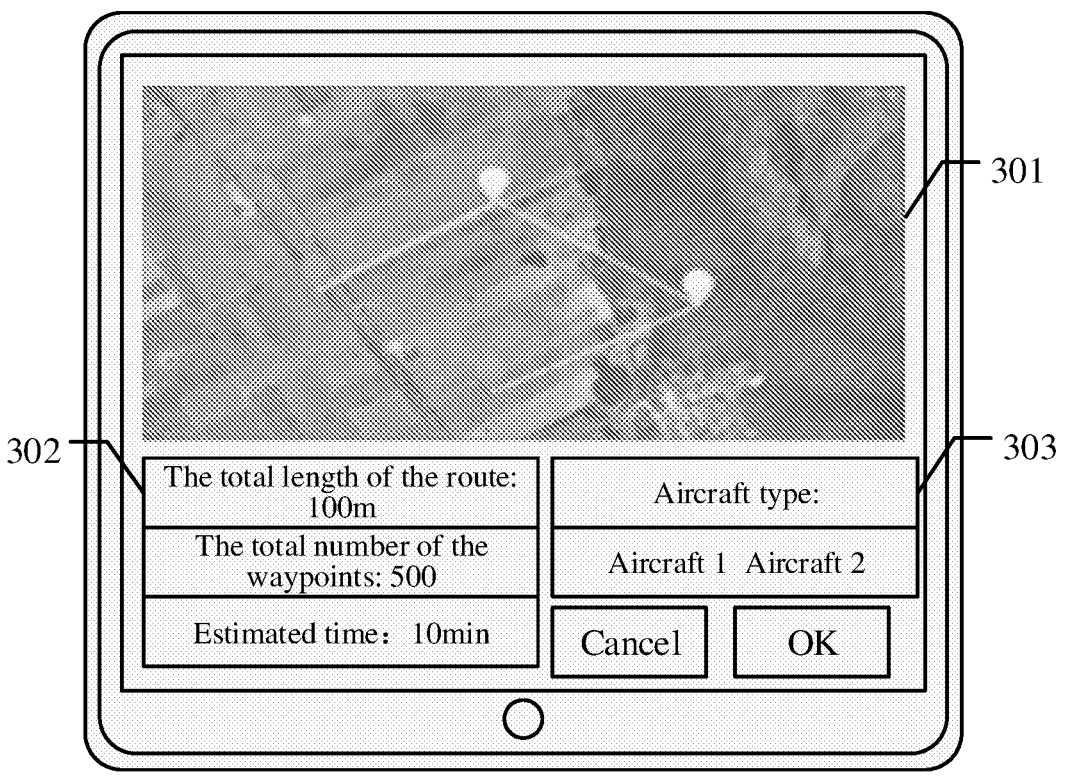
FIG. 3 illustrates a schematic diagram of an exemplary interactive interface consistent with disclosed embodiments.

FIG. 3 illustrates a schematic diagram of an exemplary interactive interface consistent with disclosed embodiments. As shown in FIG. 3, the interactive interface includes a map 301 and a route description interface 302. The route description interface may show the total length of the route configured by the user, the total number of editable waypoints, the estimated flight time, etc. The interactive interface also includes an aircraft selection interface 303. By means of this selection interface 303, the user can designate one or more aircrafts to fly the entire route obtained by editing or a partial route obtained by splitting. After the user clicks the "OK" button, according to information in the interactive interface, such as the routes configured by the user and the aircrafts designated by the user on the interactive interface, a control command may be generated and transmitted to the corresponding aircrafts, such that the corresponding aircrafts can respectively execute their own route data to complete the flight mission.

Referring again to FIG. 2, at S202, according to a preset splitting condition, the received route data is analyzed. The analysis of the route data may mainly include determining whether it is required to split the route represented by the route data. If the user edits a large number of waypoints (i.e., the number of the waypoints is greater than or equal to a preset threshold number), or if the total length of the route is too long (i.e., the total length of the route is greater than or equal to a preset threshold length), then the route may need to be split.

At S203, if the route data meets the preset splitting condition, then the route represented by the route data is split into multiple sub-routes. The principle of splitting the original route data is that: the number of waypoints of each sub-route is less than or equal to the preset threshold number, or the total length of each sub-route is shorter than or equal to the preset threshold length.

At S204, a sub-route to be executed is determined from the multiple sub-routes and is transmitted to the aircraft. The user can select any one of the multiple sub-routes for transmitting to the aircraft by touching the screen, etc. In some embodiments, after the splitting, the sub-routes can be sequentially numbered according to the positions of the sub-routes, and can be automatically transmitted to the aircraft for execution in order.

Moreover, the analysis of the route data may further include that: according to the remaining battery capacity of the aircraft waiting to execute the flight mission, determining whether the aircraft waiting to execute the flight mission can complete the route represented by the route data. If not, then the splitting condition would be satisfied and the route may need to be split to ensure that the aircraft waiting to execute the flight mission can execute at least part of the route. If there are multiple aircrafts waiting to execute the flight mission, then the route represented by the route data would be split according to the remaining battery capacity of each aircraft to obtain corresponding multiple sub-routes. The length of the sub-routes or the number of the waypoints may be different or identical. The sub-routes may be associated with the aircraft corresponding to the remaining battery capacity. After the operation of uploading the route transmitted by the user is received, according to the association relationship, the sub-routes corresponding to the length or the number of the waypoints may be transmitted to the aircraft corresponding to the remaining battery capacity, thereby allowing the plurality of aircrafts to jointly complete the route configured by the user and improving the efficiency of executing the route.

In some embodiments, the route may be split according to circumstances, which helps the aircraft to better execute the flight mission, and also helps the user to input at one time a route with any length or any number of waypoints as needed, thus not being affected by hardware structures, such as the storage capacity of the memory that stores the route data in the aircraft, and thereby improving route planning and execution efficiency.

Figure 4:
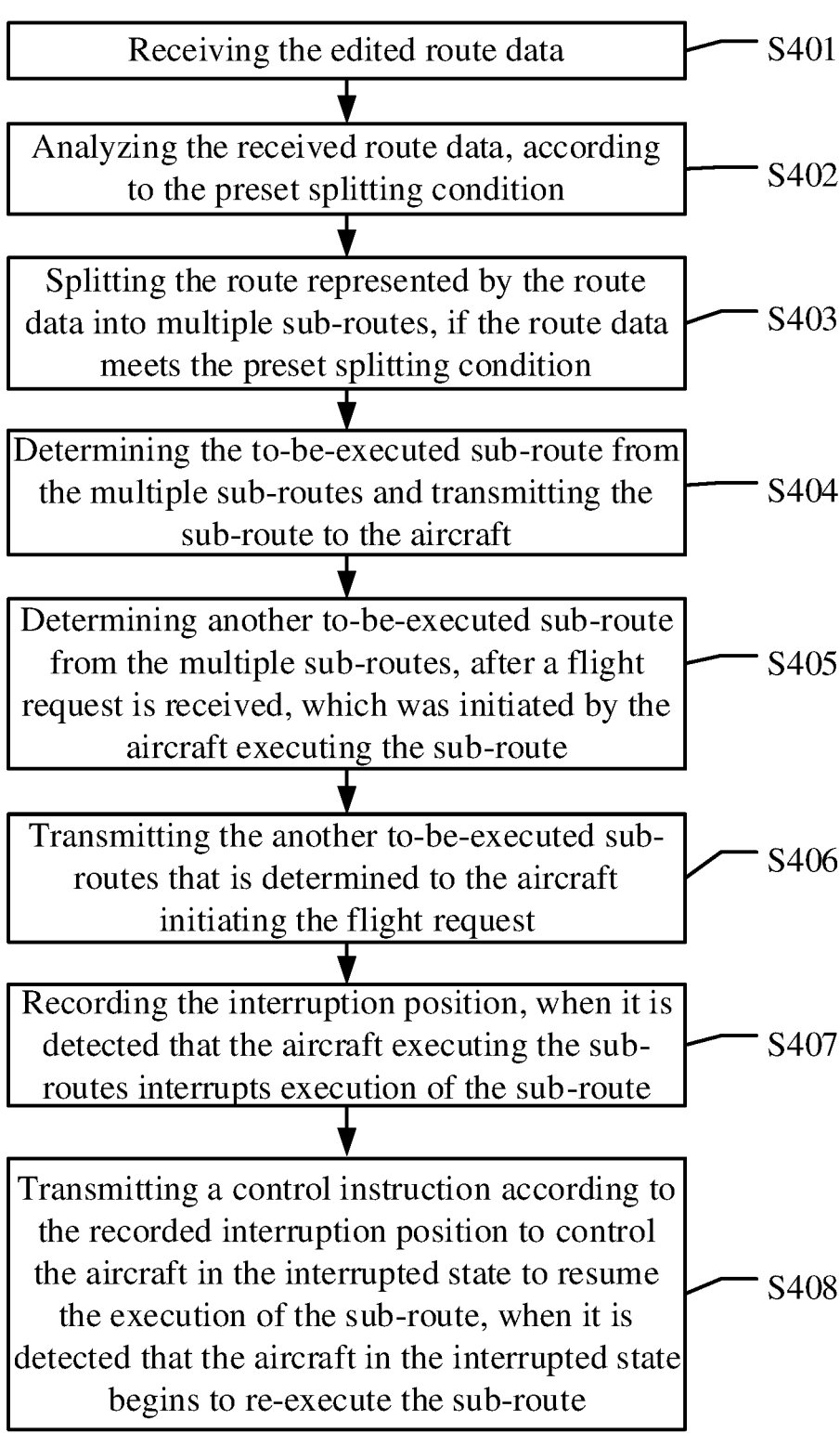
FIG. 4 illustrates a flowchart of another exemplary flight control method consistent with disclosed embodiments.

FIG. 4 illustrates a flowchart of another exemplary flight control method consistent with disclosed embodiments. The flight control method consistent with the present disclosure may be executed by a control device consistent with the disclosure, such as a smart mobile phone, a tablet computer, a dedicated smart remote-controller. The control device may have a user interface, such as a touch screen. The user can perform human-machine interaction via the user interface to complete operations such as route editing.

As shown in FIG. 4, at S401, the edited route data is received. The route data may be obtained by editing and used to instruct the aircraft to fly on the route represented by the route data.

At S402, the received route data is analyzed according to the preset splitting condition. The analysis of the route data may mainly include determining whether it is required to split the route represented by the received route data inputted by the user, which can be determined according to the number of the route waypoints, the total length of the route, and the remaining battery capacity of the aircraft.

In some embodiments, the process S402 may include determining whether the number of the waypoints included in the route data is greater than or equal to the threshold number indicated in the preset splitting condition. If the number of waypoints included in the route data is greater than or equal to the threshold number, the route data would satisfy the preset splitting condition. The threshold number may be a number directly inputted by the user, or may be automatically determined by the control device according to the capacity of the memory that stores the route data in the aircraft waiting to execute the flight mission, or may be automatically determined by the control device according to the remaining battery capacity of one or more aircrafts waiting to execute the flight mission.

In some embodiments, the process S402 may include determining whether a route length of the route is greater than or equal to the threshold length indicated in the preset splitting condition. If the route length is greater than or greater to the threshold length, the route data would satisfy the preset splitting condition. Similarly, the threshold length may be a length value directly inputted by the user, or may be automatically determined by the control device according to the capacity of the memory that stores the route data in the aircraft waiting to execute the flight mission, or may be automatically determined by the control device according to the remaining battery capacity of the one or more aircrafts waiting to execute the flight mission.

In some embodiments, if there are a plurality of aircrafts waiting to execute the flight mission, the process S402 may include acquiring the remaining battery capacity of each of aircrafts; and according to the length of the route that can be executed by the remaining battery capacity of each aircraft, the route represented by the route data may be split into multiple sub-routes. According to the scale ratio of the map, the actual length of the route configured by the user in the flight can be determined. According to the actual length, the aircraft's power consumption rate (e.g., the power consumption per unit length or unit time), and the aircraft's remaining battery capacity, it can be determined which route data of a certain length would be transmitted to which aircraft having the corresponding remaining battery capacity.

At S403, if the route data meets the preset splitting condition, the route represented by the route data is split into multiple sub-routes.

At S404, a sub-route to be executed is determined from the multiple sub-routes and transmitted to the aircraft. In some embodiments, the process S404 may include determining one or more sub-routes selected by a route-selection event as the sub-routes to be executed. The determined aircraft receiving a determination operation may serve as a target aircraft. The determination operation may determine one or more aircrafts as the target aircraft(s) from the plurality of aircrafts. The sub-route determined to be executed may be transmitted to the corresponding target aircraft. The user can manually select each sub-route as the sub-route to be executed, and can determine the aircraft for each selected sub-route. After selecting the sub-route and determining the aircraft, the control device may generate a control instruction for transmitting the sub-route to the aircraft determined by the corresponding sub-route, thereby controlling the plurality of aircrafts to execute the flight mission at the same time or in sequence.

At S405, after a flight request is received, which was initiated by the aircraft executing the sub-route, another sub-route to be executed is determined from the multiple sub-routes. That is, after finishing a certain sub-route, the aircraft may initiate a flight request to ask for execution of a next sub-route, and the user may be prompted by a pop-up window to select whether to execute the next sub-route. Moreover, by means of the interaction between the aircraft and the control device, the next sub-route can be automatically transmitted and executed.

In some embodiments, the process S405 may include: acquiring the sequence marks added to the sub-routes obtained by splitting and the sequence marks of the executed sub-routes, and determining another sub-route to be executed from the multiple sub-routes according to the order indicated by the sequence marks. In some other embodiments, the process S405 may include: acquiring positions of the sub-routes that have been executed by the aircrafts initiating the flight request in the route represented by the route data, and determining another sub-route to be executed from the obtained multiple sub-routes according to the acquired positions.

At S406, the another to-be-executed sub-route that is determined is transmitted to the aircraft initiating the flight request.

At S407, when it is detected that the aircraft executing the sub-route interrupts execution of the sub-route, the interruption position is recorded, and the aircraft is determined to be in an interrupted state. During execution of the sub-route by the aircraft, a battery of the aircraft may need to be changed or the user may need to preferentially execute another flight mission nearby, and hence the sub-route being executed by the aircraft may be manually interrupted. Upon detecting that the aircraft interrupts execution of the current sub-route, at this point, the interruption position of the aircraft can be recorded.

At S408, when it is detected that the aircraft in the interrupted state begins to re-execute the sub-route, a control instruction is transmitted according to the recorded interruption position to control the aircraft in the interrupted state to resume the execution of the sub-route.

In some embodiments, upon detecting that the aircraft interrupts execution of the sub-route, it may not be needed to record the current interruption position. After the user manually switches the aircraft back to execute the sub-route, and when the aircraft is in the route recovery state, any waypoint on the sub-route that was executed before the interruption may be selected as a starting position to re-execute the sub-route prior to the interruption, or to re-receive and execute a new sub-route.

The present disclosure also provides a computer storage medium storing program instructions that can execute the flight control method shown in FIG. 2 and/or FIG. 4.

In some embodiments, the route may be split according to circumstances, which helps the aircraft to better execute the flight mission, and also helps the user to input at one time a route with any length or any number of waypoints as needed, thus not being affected by hardware structures, such as the storage capacity of the memory that stores the route data in the aircraft, and thereby improving route planning and execution efficiency.

Figure 5:
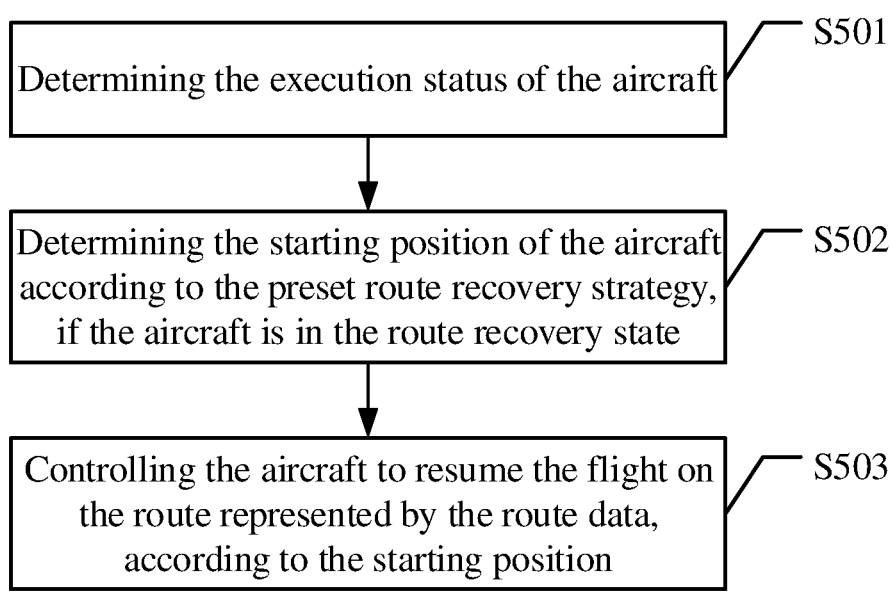
FIG. 5 illustrates a flowchart of another exemplary flight control method consistent with disclosed embodiments.

FIG. 5 illustrates a flowchart of another exemplary flight control method consistent with disclosed embodiments. The flight control method consistent with the present disclosure may be executed by a control device consistent with the disclosure, such as a smart mobile phone, a tablet computer, a dedicated smart remote-controller. The control device may have a user interface, such as a touch screen. The user can perform human-machine interaction via the user interface to complete operations such as route editing.

At S501, the execution status of the aircraft is determined. The execution status of the aircraft can be detected in accordance with the user's operation. A gear selector having a gear position (e.g., "P" position) may be provided in the control device to control the aircraft. When it is detected that the aircraft is currently flying under the control of the "P" gear position, the aircraft can be regarded as automatically executing the route data preset for the aircraft, and the aircraft is in a normal state. If it is detected that the control device is switched out of the "P" position, the aircraft can be regarded to be in the interrupted state. If it is detected that the control device is switched back to the "P" position, the aircraft can be regarded to be in the route recovery state within a certain period of time after switching back to the "P" position (the aircraft needs a certain period of time to fly back to the route represented by the preset route data). In some embodiments, the execution status may also be determined according to whether the aircraft is flying on the route represented by the route data. For example, according to the coordinates transmitted during the flight of the aircraft, if it is determined that the aircraft is continuously flying on the each of the waypoints include in the preset route data, the aircraft can be regarded to be in the normal state. If it is determined that the aircraft does not fly on the waypoints included in the preset route data for a period of time, the aircraft can be regarded to be in the interrupted state. If it is detected that the user transmits the control instruction commanding the aircraft to fly on the route represented by the preset route data, the aircraft can be regarded to be in the route recovery state.

At S502, if the aircraft is in the route recovery state, the starting position of the aircraft is determined according to the preset route recovery strategy. The route recovery state may indicate that the aircraft has been switched from interrupting execution of the route data to resuming execution of the route data. For example, after the aircraft switches back to the "P" position, or when the user transmits a control instruction to re-execute the route represented by the preset route data, the aircraft can be regarded to be in the route recovery state.

The preset route recovery strategy may include a plurality of strategies. In some embodiments, the starting position determined by the route recovery strategy may include: any one of the waypoints included in the preset route data, or the waypoint that is included in the preset route data and is the closest to the current position of the aircraft, or the last waypoint before or the next waypoint after the waypoint that is included in the preset route data and is the closest to the current position of the aircraft, etc. In some other embodiments, the starting position may even be any one of the waypoints or the starting waypoint included in new route data that need to be executed.

Figure 6:
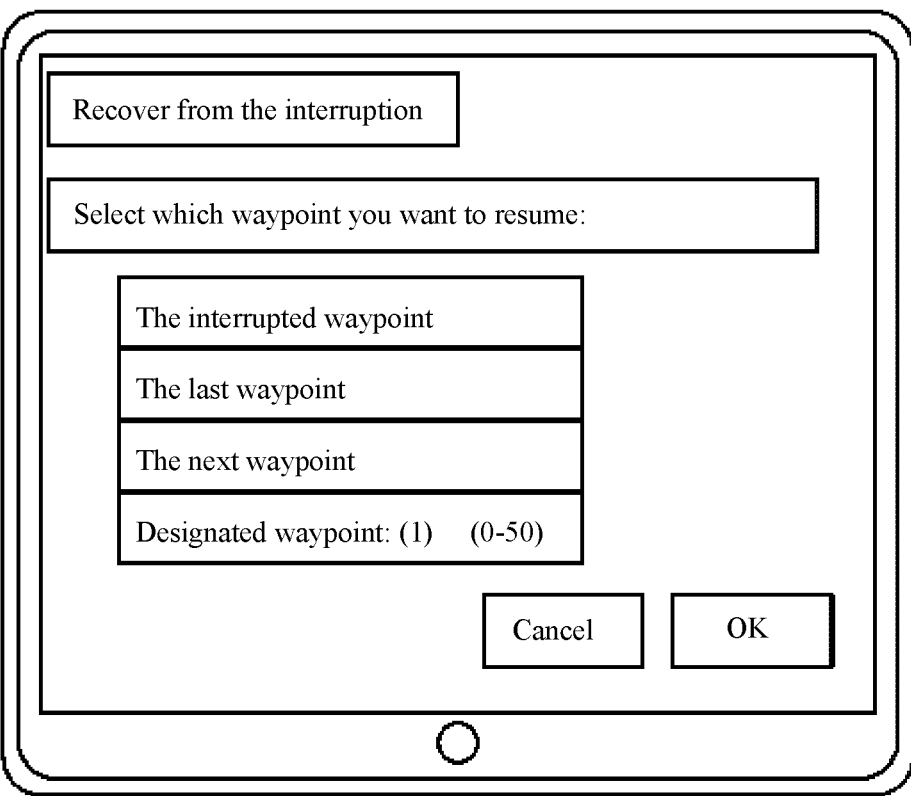
FIG. 6 illustrates a schematic diagram of another exemplary interactive interface consistent with disclosed embodiments.

FIG. 6 illustrates a schematic diagram of another exemplary interactive interface consistent with disclosed embodiments. As shown in FIG. 6, the route recovery strategy is a strategy generated based on the information inputted by the user on the user interface. In FIG. 6, there are four options provided to the user, i.e., the interruption point (i.e., the waypoint recorded when execution of the preset route data is interrupted), the last waypoint, the next waypoint, and the designated waypoint. The user can select one of the four options to generate the route recovery strategy, thereby determining the starting position when the aircraft is in the route recovery state.

In some embodiments, the process S502 may include taking any one of the waypoints included in the route data that is interrupted to be executed by the aircraft as the starting position, according to the instruction of the preset route recovery strategy. In some embodiments, if it is detected that the aircraft executing the preset route interrupts execution of the preset route, the current flight position of the aircraft can be recorded. In some embodiments, determining the starting position (S502) may include determining the starting position of the aircraft on the route represented by the preset route data according to the route recovery strategy and the recorded flight position. For example, the flight position itself may serve as the starting position. In some embodiments, after the flight position is recorded, determining the starting position (S502) may include determining the waypoint having the shortest distance to the acquired flight position among the waypoints included in the route data as the starting position of the aircraft, according to the instruction of the preset route recovery strategy. In some embodiments, according to the instruction of the preset route recovery strategy, the waypoint having the shortest distance to the acquired flight position among the waypoints included in the route data may be determined, and the last waypoint before or the next waypoint after this determined waypoint on the route represented by the route data may be determined as the starting position.

Referring again to FIG. 5, at S503, the aircraft is controlled to resume the flight on the route represented by the route data according to the starting position. That is, after the starting position is determined, a control command pertaining to the starting position may be generated and transmitted to the aircraft, such that the aircraft may fly to the starting position and may resume execution of the route corresponding to the preset route data according to the starting position. In some other embodiments, new route data may also be executed according to the starting position of the new route data.

In some embodiments, the preset route data may include data of the sub-routes, received from the ground-control end and split from the originally intact route by the ground-control end. For the specific splitting strategy and the related processing description of the sub-routes, reference can be made to the related description in the foregoing embodiments. The preset route data may also be one or more intact route data. In some embodiments, the preset route data may be one or more sub-routes obtained by splitting the intact route data inputted by the user.

When multiple aircrafts executing the flight mission are in the route recovery state, the starting positions of the aircrafts may be determined according to the preset route recovery strategy, respectively. According to the determined starting position of each aircraft, each aircraft may be operated to resume the flight on the route represented by the route data that was interrupted to be executed by each aircraft.

The present disclosure also provides a computer storage medium storing program instructions that can execute the flight control method shown in FIG. 5.

In some embodiments, the route may be split according to circumstances, which helps the aircraft to better execute the flight mission, and also helps the user to input at one time a route with any length or any number of waypoints as needed, thus not being affected by hardware structures, such as the storage capacity of the memory that stores the route data in the aircraft, and thereby improving route planning and execution efficiency.

The following will describe in detail the flight control apparatus and the control device consistent with the present disclosure.

Figure 7:
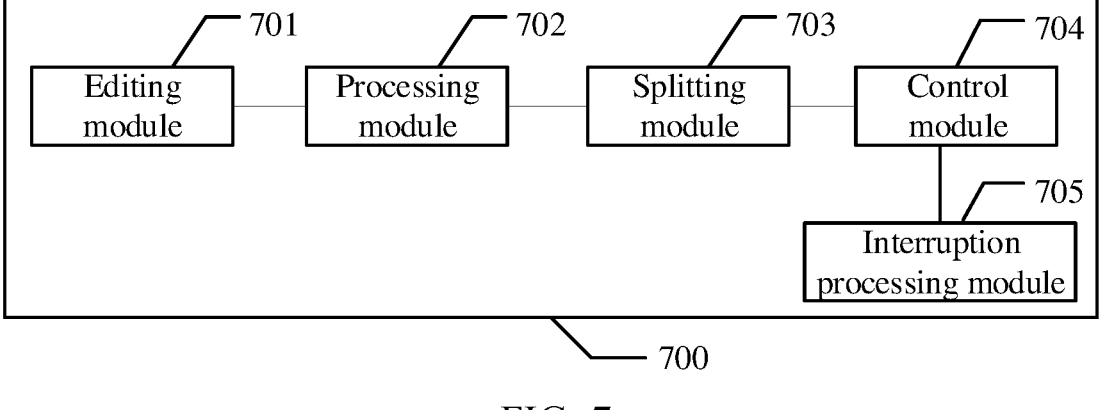
FIG. 7 illustrates a schematic structural diagram of an exemplary flight control apparatus consistent with disclosed embodiments.

FIG. 7 illustrates a schematic structural diagram of an exemplary flight control apparatus consistent with disclosed embodiments. The flight control apparatus 700 may be implemented by the ground end. And the ground end may be a control device, such as a smart mobile phone, a tablet computer, a dedicated smart remote-controller, an aircraft ground-control station, and a combination. These control devices may have a user interface, such as a touch screen. The user can perform human-machine interaction via the user interface to complete operations such as route editing.

The flight control apparatus 700 includes the following modules an editing module 701 for editing the obtained route data indicating that the aircraft is flying on the route represented by the route data, a processing module 702 for analyzing the received route data, according to the preset splitting condition, a splitting module 703 for splitting the route represented by the route data into multiple sub-routes if the result of the analysis from the processing module 702 indicates that the route data meet the preset splitting condition, and a control module 704 for determining the to-be-executed sub-route from the multiple sub-routes and transmitting the determined to-be-executed sub-route to the aircraft.

Further, in some embodiments, splitting rules by which the splitting module 703 splits the route represented by the route data into multiple sub-routes may include: that the number of the waypoints of each of the sub-routes is less than or equal to the preset threshold number; or that the total length of each of the sub-routes is shorter than or equal to the preset threshold length; or splitting according to the remaining battery capacity of each aircraft.

Further, in some embodiments, the processing module 702 may determine whether the number of the waypoints included in the route data is greater than or equal to the threshold number indicated in the preset splitting condition. If the number of waypoints included in the route data is greater than or equal to the threshold number, the route data would satisfy the preset splitting condition.

Further, in some embodiments, the processing module 702 may determine whether a route length of the route is greater than or equal to the threshold length indicated in the preset splitting condition. If the route length is greater than or equal to the threshold length, the route data would satisfy the preset splitting condition.

Further, in some embodiments, the processing module 702 may acquire the remaining battery capacity of each aircraft when the aircraft includes a plurality of aircrafts. And the processing module 702 may split the route represented by the route data into multiple sub-routes according to the length of the route that can be executed by the remaining battery capacity of each aircraft.

Further, in some embodiments, the control module 704 may determine the one or more sub-routes selected by the route selecting event as the sub-route(s) to be executed. The control module 704 may take the aircraft that was determined by the received determining operation as the target aircraft. The determining operation may determine one or more aircrafts from the plurality of aircrafts as the target aircraft(s). And the control module 704 may transmit the to-be-executed sub-routes that have been determined to the target aircraft.

Further, in some embodiments, the control module 704 may also determine another sub-route to be executed from the multiple sub-routes, after receiving the flight request initiated by the aircraft executing the sub-routes. The control module 704 may transmit the another to-be-executed sub-route to the aircraft initiating the flight request.

Further, in some embodiments, the control module 704 may acquire the sequence marks added to each sub-route and the sequence marks of the sub-routes that have been executed by the aircraft. The control module 704 may determine the another sub-route to be executed from the multiple sub-routes according to the order indicated in the sequence marks.

Further, in some embodiments, the control module 704 may acquire the positions of the sub-routes that have been executed by the aircraft initiating the flight request in the route represented by the route data. The control module 704 may determine the another sub-route to be executed from the obtained multiple sub-routes according to the acquired positions.

Further, in some embodiments, the flight control apparatus 700 includes an interruption processing module 705, for recording the interruption position of the aircraft upon detecting that the aircraft, executing the sub-route, interrupts execution of the sub-route and is in an interrupted state. Upon detecting that the aircraft in the interrupted state begins to resume the sub-route according to the interruption position recorded, a control instruction may be transmitted to control the aircraft in the interrupted state to resume execution of the sub-routes.

In some embodiments, for the implementation of each module included in the flight control apparatus 700, reference can be made to the description of relevant functions and processes in the foregoing embodiments corresponding to FIG. 1 through FIG. 5, and details are not described herein.

In some embodiments, the route may be split according to circumstances, which helps the aircraft to better execute the flight mission, and also facilitates the user to input at one time a route with any length or any number of waypoints as required, thus not being affected by hardware structures, such as the storage capacity of the memory that stores the route data in the aircraft, and thereby improving route planning and execution efficiency.

Figure 8:
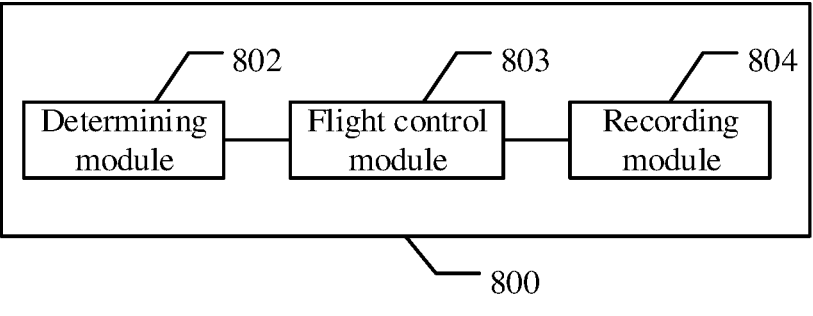
FIG. 8 illustrates a schematic structural diagram of another exemplary flight control apparatus consistent with disclosed embodiments.

FIG. 8 illustrates a schematic structural diagram of another exemplary flight control apparatus consistent with disclosed embodiments. The flight control apparatus 800 may be implemented by the ground end. And the ground end may be a control device, such as a smart mobile phone, a tablet computer, a dedicated smart remote-controller.

The apparatus consistent with the present disclosure includes the following modules: a determining module 802 for determining the starting position of the aircraft according to the preset route recovery strategy when the aircraft is in the route recovery state, and a flight control module 803 for controlling the aircraft to resume the flight on the route represented by the route data according to the starting position.

Further, in some embodiments, the determining module 802 may use any one of the waypoints included in the route data that was interrupted to be executed by the aircraft, according to the instruction of the preset route recovery strategy.

Further, in some embodiments, the flight control apparatus 800 also includes a recording module 804 for recording the flight position of the aircraft when the aircraft interrupts execution of the route data, and a determining module 802 for determining the starting position of the aircraft on the route represented by the route data according to the route recovery strategy and the recorded flight position.

Further, in some embodiments, the determining module 802 may determine the waypoint, having the shortest distance from the recorded flight position, among the waypoints included in the route data as the starting position of the aircraft, according to the instruction of the preset route recovery strategy. In some embodiments, according to the instruction of the preset route recovery strategy, the determining module 802 may determine the waypoint, having the shortest distance from the acquired flight position, among the waypoints included in the route data, and the determining module 802 may determine the last waypoint before or the next waypoint after this determined waypoint on the route represented by the route data as the starting position of the aircraft.

Further, in some embodiments, the route data may include the data of the sub-routes received from the ground control end and split from the originally intact route by the ground control end. The preset route may also be the intact route inputted by the user of the ground control end.

Further, in some embodiments, the determining module 802 may also determine the starting position of each aircraft, according to the preset route recovery strategy when the execution status of the plurality of aircrafts is in the route recovery state. The flight control module 803 may also control each aircraft to resume the flight on the route represented by the route data that was interrupted to be executed by each aircraft, according to the determined starting position of each aircraft.

In some embodiments, for the implementation of each module included in the flight control apparatus 800, reference can be made to the description of relevant functions and processes in the foregoing embodiments corresponding to FIG. 1 through FIG. 5, details are not described herein.

In some embodiments, the route may be split according to circumstances, which helps the aircraft to better execute the flight mission, and also facilitates the user to input at one time a route with any length or any number of waypoints as required, thus not being affected by hardware structures, such as the storage capacity of the memory that stores the route data in the aircraft, and thereby improving route planning and execution efficiency.

Figure 9:
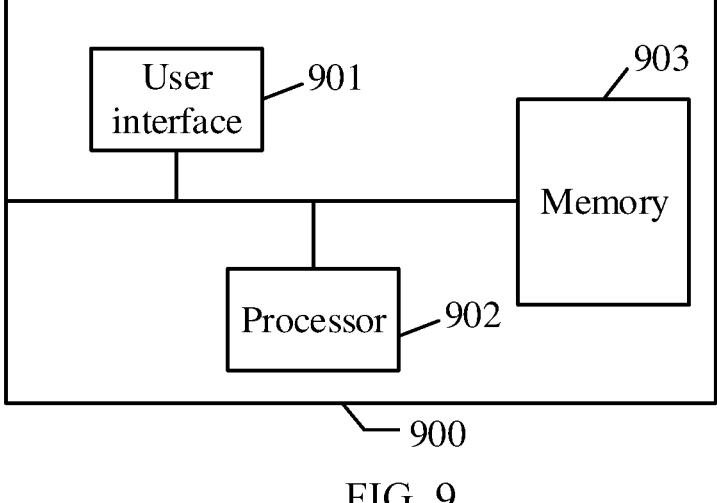
FIG. 9 illustrates a schematic structural diagram of an exemplary control device consistent with disclosed embodiments.

FIG. 9 illustrates a schematic structural diagram of an exemplary control device consistent with disclosed embodiments. The control device 900 may be a smart mobile phone, a tablet computer, a dedicated smart remote controller, an aircraft ground-end control station, a combination thereof, etc. The control device 900 may include a power module, a housing shell, and other functional modules, such as a camera. As shown in FIG. 9, the control device 900 also includes a user interface 901, a processor 902, and a memory 903.

The memory 903 may include a volatile memory, such as a random-access memory (RAM). The memory 903 may also include a non-volatile memory, such as a flash memory, a hard disk drive (HDD), or a solid-state drive (SSD).

The processor 902 may be a central processing unit (CPU). The processor 902 may also include a hardware chip. The hardware chip may be an application-specific integrated circuit (ASIC), a programmable logic device (PLD), or a combination thereof. The PLD may be a complex program-mable logic device (CPLD), a field-programmable gate array (FPGA), etc.

In some embodiments, the memory 903 may also store program instructions. The processor 902 may call the pro-gram instructions to implement a flight control method consistent with the disclosure, such as one of those described above in connection with FIG. 3 and FIG. 4.

In some embodiments, the user interface 901 may display the user interface and acquire user's operation instructions. The processor 902 may edit the obtained route data which indicates that the aircraft is flying on the route represented by the route data. The processor 902 may analyze the received route data according to the preset split condition. If the route data meets the preset splitting condition, the processor 902 may split the route represented by the route data into multiple sub-routes. The processor 902 may deter-mine the sub-route to be executed from the multiple sub-routes and transmit the determined sub-route to the aircraft.

Splitting rules by which the processor 902 splits the route represented by the route data into the multiple sub-routes may include: that the number of the waypoints of each of the sub-routes is less than or equal to the threshold number, or that the total length of each of the sub-routes is shorter than or equal to the threshold length, or splitting according to the remaining battery capacity of the aircraft.

Further, in some embodiments, the route data may include multiple waypoints. When analyzing the received route data according to the preset splitting condition, the processor 902 may in some embodiments determine whether the number of the waypoints included in the route data is greater than or equal to the threshold number indicated in the preset split-ting condition. If greater than the threshold number, the route data would satisfy the preset splitting condition.

Further, in some embodiments, when analyzing the received route data according to the preset splitting condi-tion, the processor 902 may in some embodiments determine whether a route length of the route is greater than or equal to the threshold length indicated in the preset splitting condition. If the route length is greater than or equal to the threshold length, the route data would satisfy the preset splitting condition.

Further, in some embodiments, there may be a plurality of aircrafts. When splitting the route represented by the route data into multiple sub-routes, the processor 902 may acquire the remaining battery capacity of each aircraft. According to the route length that can be executed by the remaining battery capacity of each aircraft, the processor 902 may split the route represented by the route data into multiple sub-routes.

Further, in some embodiments, when determining the sub-route to be executed from the obtained multiple sub-routes and transmitting the determined sub-route to the aircraft, the processor 902 may determine the one or more sub-routes selected by the route selecting event as the sub-route(s) to be executed. The processor 902 may take the aircraft that was determined by the received determining operation as the target aircraft. The determining operation may determine one or more aircrafts from the plurality of aircrafts as the target aircraft(s). The processor 902 may transmit the to-be-executed sub-routes that have been deter-mined to the target aircraft.

Further, in some embodiments, the processor 902 may also determine another sub-route to be executed from the multiple sub-routes after receiving the flight request initiated by the aircraft executing the sub-routes. The processor 902 may transmit the another to-be-executed sub-route to the aircraft initiating the flight request.

Further, in some embodiments, when determining the another sub-route to be executed from the multiple sub-routes, the processor 902 may acquire the sequence mark added to each of the sub-routes and the sequence marks of the sub-routes that have been executed by the aircraft. The processor 902 may determine the another sub-route to be executed from the multiple sub-routes, according to the order indicated by the sequence mark.

Further, in some embodiments, when determining the another sub-route to be executed from the multiple sub-routes, the processor 902 may acquire the positions of the sub-routes that have been executed by the aircraft initiating the flight request in the route represented by the route data. According to the acquired positions, the processor 902 may determine the another sub-route to be executed from the multiple sub-routes.

Further, in some embodiments, when detecting that the aircraft interrupts execution of the sub-routes, the processor 902 may also record the current interruption position of the aircraft, and the aircraft may be in an interrupted state. When detecting that the aircraft in the interrupted state resumes execution of the sub-routes, according to the interruption position recorded, the processor 902 may transmit the con-trol instruction for controlling the aircraft in the interrupted state to resume execution of the sub-routes.

For specific implementations of the processor 902 and the user interface 901 included in the control device 900, reference can be made to the description of relevant func-tions and processes in the foregoing embodiments corre-sponding to FIG. 1 through FIG. 4, and details are described herein.

In some embodiments, the route may be split according to circumstances, which helps the aircraft to better execute the flight mission, and also facilitates the user to input at one time a route with any length or any number of waypoints as required, thus not being affected by hardware structures, such as the storage capacity of the memory that stores the route data in the aircraft, and thereby improving route planning and execution efficiency.

Figure 10:
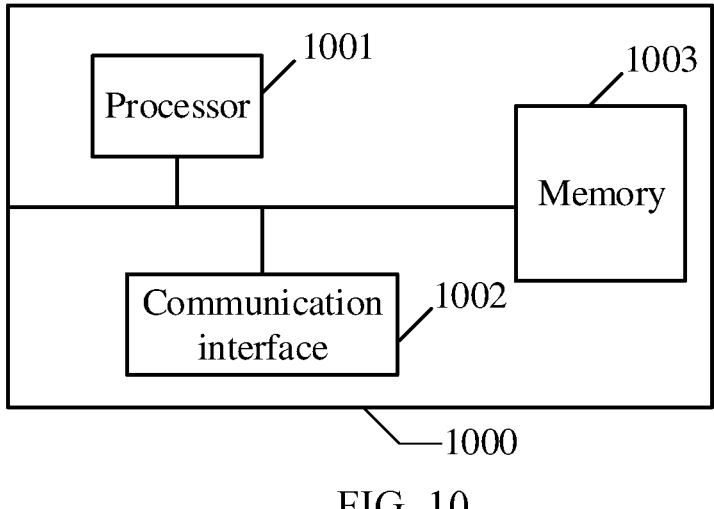
FIG. 10 illustrates a schematic structural diagram of another exemplary control device consistent with disclosed embodiments.

FIG. 10 illustrates a schematic structural diagram of another exemplary control device consistent with disclosed embodiments. The control device 1000 may be a smart mobile phone, a tablet computer, a dedicated smart remote controller, an aircraft ground-control station, a combination thereof, etc. The control device 1000 may include a power module, a housing shell, and other functional modules, such as a camera (the UAV ground controller may not have a camera). As shown in FIG. 10, the control device 1000 also includes a processor 1001, a communication interface 1002, and a memory 1003.

The memory 1003 may include a volatile memory, such as a random-access memory (RAM). The memory 1003 may also include a non-volatile memory, such as a flash memory, a hard disk drive (HDD), or a solid-state drive (SSD).

The process 1001 may be a central processing unit (CPU). The processor 1001 may also include a hardware chip. The hardware chip may be an application-specific integrated circuit (ASIC), a programmable logic device (PLD), or a combination thereof. The PLD may be a complex program-mable logic device (CPLD), a field-programmable gate array (FPGA), etc.

In some embodiments, the memory 1003 may store pro-gram instructions. The processor 1001 may call the program instructions to implement the flight control method shown in the embodiments of FIG. 5.

In some embodiments, when the aircraft is in the route recovery state, the processor 1001 may determine the starting position of the aircraft according to the preset route recovery strategy. The route recovery strategy may indicate that the aircraft has been switched from interrupting execution of the route data to resuming execution of the route data. According to the starting position, the processor 1001 may control the aircraft to resume the flight on the route represented by the route data. The communication interface 1002 may transmit the control instruction generated by the processor 1001 to the aircraft for controlling the aircraft to resume the flight on the route represented by the preset route data.

Further, in some embodiments, when determining the starting position of the aircraft according to the preset route recovery strategy, the processor 1001 may set any one of the waypoints included in the route data that was interrupted to be executed by the aircraft as the starting position, according to the instruction of the preset route recovery strategy.

Further, in some embodiments, when detecting that the aircraft interrupts execution of the route data, the processor 1001 may record the flight position of the aircraft. According to the route recovery strategy and the recorded flight position, the processor 1001 may determine the starting position of the aircraft on the route represented by the route data.

Further, in some embodiments, when determining the starting position of the aircraft according to the preset route recovery strategy and the acquired flight position, the processor 1001 may in some embodiments determine the waypoint having the shortest distance from the recorded flight position in the waypoints included in the route data as the starting position of the aircraft. In some embodiments, according to the instruction of the preset route recovery strategy, the processor 1001 may determine the waypoint having the shortest distance from the acquired flight position in the waypoints included in the route data, and the processor 1001 may determine the last waypoint before or the next waypoint after this determined waypoint on the route represented by the route data as the starting position of the aircraft.

Further, in some embodiments, the route data may include the data of the sub-routes received from the ground control end and split from the originally intact route by the ground control end. The route data may be preset, which may be the intact route inputted by the user or may be the data of the sub-routes split from the intact route data.

Further, in some embodiments, when the execution status of the plurality of aircrafts is in the route recovery state, the processor 1001 may also determine the starting position of each aircraft according to the preset route recovery strategy. According to the respectively determined starting position of each aircraft, the processor 1001 may control each aircraft to resume the flight on the route represented by the route data that was interrupted to be executed by each aircraft.

In some embodiments, for the implementation of the processor 1001 included in the control device 1000, reference can be made to the description of relevant functions and processes in the foregoing embodiments corresponding to FIG. 1 through FIG. 5, and details are not described herein.

In some embodiments, the route may be split according to circumstances, which helps the aircraft to better execute the flight mission, and also facilitates the user to input at one time a route with any length or any number of waypoints as required, thus not being affected by hardware structures, such as the storage capacity of the memory that stores the route data in the aircraft, and thereby improving route planning and execution efficiency.

It should be understood by those ordinary skilled in the art that the above all or part of the flows in the method examples of the foregoing embodiments can be realized by computer programs instructing corresponding hardware, and the programs can be stored in computer readable storage media. When the programs are executed, the flows in the above method examples can be included. The storage media can be a magnetic disc, a disc, a read-only memory (ROM) or a random-access memory (RAM), etc.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A control method comprising:
   generating, through a processor, route data of a route, the route data including data of a plurality of sub-routes obtained by splitting the route;
   instructing a plurality of movable objects to execute the route data;
   detecting an execution status of each of the plurality of movable objects, the execution status of each of the plurality of movable objects including at least one of an interrupted state, a normal state, or a route recovery state, the movable object in the interrupted state undergoing an interruption of the execution of the route; and
   in response to detecting that the plurality of movable objects are in the route recovery state, controlling the plurality of movable objects in the route recovery state to execute the plurality of sub-routes, respectively, according to a plurality of starting positions, each starting position including at least one of a waypoint of a plurality of waypoints before an interruption, a position determined according to a flight position recorded at a time of the interruption, or a user-designated waypoint.

2. The method of claim 1, wherein the position determined according to the flight position recorded at the time of the interruption includes at least one of:
   an interruption point;
   a last waypoint of the route before the interruption point;
   a next waypoint of the route after the interruption point;
   one of the plurality of waypoints that is closest to the flight position;
   a last waypoint before the one of the plurality of waypoints that is closest to the flight position;
   a next waypoint after the one of the plurality of waypoints that is closest to the flight position; or
   a waypoint that is within a preset distance range of the flight position.

3. The method of claim 1, wherein the route recovery state indicates that the movable object switches from the interrupted state to resuming execution of the route data.

4. The method of claim 1, further comprising:
   displaying, on the display, a plurality of candidate starting positions;
   in response to a selection instruction, selecting, through the processor, a target starting position from the plurality of candidate starting positions; and
   controlling, through the processor, one of the plurality of movable objects in the interrupted state to fly to the target starting position and resume the execution of the route from the target starting position.

5. The method of claim 1, further comprising:

in response to detecting that one of the plurality of movable objects is in the interrupted state, recording, through a memory, an interruption point during execution of the route by the one of the plurality of movable objects.

6. The method of claim 1, wherein the operation instruction is a first operation instruction;

the method further comprising:

analyzing the route data according to a preset splitting condition, including determining whether a total number of waypoints included in the route data is greater than or equal to a threshold number indicated in the preset splitting condition;

splitting the route into the plurality of sub-routes in response to the route data satisfying the preset splitting condition;

displaying the plurality of sub-routes and at least one of the plurality of movable objects on the user interface;

determining a to-be-executed sub-route from the plurality of sub-routes and one of the plurality of movable objects from the at least one of the plurality of movable objects according to a second operation instruction; and transmitting the to-be-executed sub-route to the one of the plurality of movable objects for instructing the one of the plurality of movable objects to fly on the to-be-executed sub-route.

7. The method of claim 6, wherein splitting the route into the plurality of sub-routes includes:

splitting the route such that a number of waypoints of each of the sub-routes is less than or equal to a threshold number;

splitting the route such that a total length of each of the sub-routes is shorter than or equal to a threshold length; or splitting the route according to a remaining battery capacity of the plurality of movable objects.

8. The method of claim 6, wherein analyzing the route data according to the preset splitting condition includes:

determining that the route data satisfies the preset splitting condition in response to the total number of the waypoints included in the route data being greater than or equal to the threshold number.

9. The method of claim 6, wherein analyzing the route data according to the preset splitting condition includes:

determining whether a route length of the route is greater than or equal to a threshold length indicated in the preset splitting condition; and determining that the route data satisfies the preset splitting condition in response to the route length being greater than or equal to the threshold length.

10. The method of claim 6, wherein:

splitting the route represented by the route data into the plurality of sub-routes includes:

acquiring a remaining battery capacity of each of the plurality of movable objects; and splitting the route represented by the route data into the plurality of sub-routes according to route lengths that are able to be executed with the remaining battery capacities of the plurality of movable objects.

11. The method of claim 6, wherein determining the to-be-executed sub-route from the plurality of sub-routes and the one of the plurality of movable objects from the at least one of the plurality of movable objects includes:

determining one of the plurality of sub-routes that is selected by a route selecting event as the to-be-executed sub-route; and determining an movable object selected by the second operation instruction as the one of the plurality of movable objects to fly on the route.

12. The method of claim 6, further comprising:

determining a next to-be-executed sub-route from the plurality of sub-routes in response to receiving a flight request initiated by the one of the plurality of movable objects; and transmitting the next to-be-executed sub-route to the one of the plurality of movable objects.

13. The method according to claim 12, wherein:

determining the next to-be-executed sub-route includes:

acquiring sequence marks of the plurality of sub-routes; and determining the next to-be-executed sub-route from the plurality of sub-routes according to an order indicated by the sequence marks; or determining the next to-be-executed sub-route includes:

acquiring a position of one of the plurality of sub-routes that has been executed by the movable object in the route represented by the route data; and determining the next to-be-executed sub-route from the plurality of sub-routes according to the position.

14. The method of claim 1, further comprising: displaying, on a display, a user interface configured to receive an operation instruction, the operation instruction including a plurality of waypoints, and the route being generated based on the plurality of waypoints.

15. A control device comprising:

a memory storing a program code;

a processor configured to execute the program code to:

generate route data of a route, the route data including data of a plurality of sub-routes obtained by splitting the route;

instruct a plurality of movable objects to execute the route data;

detect an execution status of each of the plurality of movable objects, the execution status of each of the plurality of movable objects including at least one of an interrupted state, a normal state, or a route recovery state, the movable object in the interrupted state undergoing an interruption of the execution of the route; and in response to detecting that the plurality of movable objects are in the route recovery state, control the plurality of movable objects in the route recovery state to execute the plurality of sub-routes, respectively, according to a plurality of starting positions, each starting position including at least one of a waypoint of a plurality of waypoints before an interruption, a position determined according to a flight position recorded at a time of the interruption, or a user-designated waypoint.

16. The control device of claim 15, wherein the position determined according to the flight position recorded at the time of the interruption includes at least one of:

an interruption point;

a last waypoint of the route before the interruption point;

a next waypoint of the route after the interruption point;

one of the plurality of waypoints that is closest to the flight position;

a last waypoint before the one of the plurality of way-
points that is closest to the flight position;

a next waypoint after the one of the plurality of waypoints
that is closest to the flight position; or a waypoint that is within a preset distance range of the
flight position.

17. The control device of claim 15, wherein the memory
is further configured to record an interruption point during
execution of the route by one of the plurality of movable
objects in response to the processor detecting that the one of
the plurality of movable objects is in the interrupted state.

18. The control device of claim 15, further comprising:

a display configured to, after one of the plurality of
movable objects enters the interrupted state, display a
plurality of candidate starting positions;

wherein the processor is further configured to:

in response to a selection instruction, select a target
starting position from the plurality of candidate
starting positions; and control the one of the plurality of movable objects in
the interrupted state to fly to the target starting
position and resume the execution of the route from
the target starting position.

19. The control device of claim 15, wherein the route
recovery state indicates that the movable object switches
from the interrupted state to resuming execution of the route
data.

20. A control method comprising:

generating, through a processor, route data of a route;

instructing the movable object to execute the route data
based on a first operation instruction;

detecting an execution status of the movable object, the
execution status of the movable object including at
least one of an interrupted state, a normal state, or a
route recovery state, the movable object in the inter-
rupted state undergoing an interruption of the execution
of the route;

in response to detecting that the movable object is in the
route recovery state, controlling the movable object in
the route recovery state to resume the execution of the
route according to a starting position, the starting
position including at least one of a waypoint of a
plurality of waypoints before an interruption, a position
determined according to a flight position recorded at a
time of the interruption, or a user-designated waypoint;

analyzing the route data according to a preset splitting
condition, including determining whether a total num-
ber of waypoints included in the route data is greater
than or equal to a threshold number indicated in the
preset splitting condition;

splitting the route into a plurality of sub-routes in
response to the route data satisfying the preset splitting
condition;

displaying the plurality of sub-routes and at least one
candidate movable object on the user interface;

determining a to-be-executed sub-route from the plurality
of sub-routes and the movable object from the at least
one candidate movable object according to a second
operation instruction; and transmitting the to-be-executed sub-route to the movable
object for instructing the movable object to fly on the
to-be-executed sub-route.

* * * * *